(12) United States Patent
Martwick et al.

(10) Patent No.: US 7,203,853 B2
(45) Date of Patent: Apr. 10, 2007

(54) APPARATUS AND METHOD FOR LOW LATENCY POWER MANAGEMENT ON A SERIAL DATA LINK

(75) Inventors: Andrew W. Martwick, Folsom, CA (US); Ken Drottar, Portland, OR (US); David S. Dunning, Portland, OR (US); Zale T. Schoenborn, Portland, OR (US); Andrew M. Volk, Granite Bay, CA (US); Ronald W. Swartz, Orangevale, CA (US); Dennis J. Miller, Sherwood, OR (US)

(73) Assignee: Intel Corporation, Santa Clara, CA (US)

( * ) Notice: Subject to any disclaimer, the term of this patent is extended or adjusted under 35 U.S.C. 154(b) by 534 days.

(21) Appl. No.: 10/302,295

(22) Filed: Nov. 22, 2002

(65) Prior Publication Data

US 2004/0103333 A1    May 27, 2004

(51) Int. Cl.
*G06F 12/00* (2006.01)
(52) U.S. Cl. .................. 713/320; 713/300; 713/310; 713/321; 713/322; 713/323; 713/324; 713/330; 713/340

(58) Field of Classification Search ............... 713/300, 713/310, 320–324, 330, 340; 375/308; 711/202, 711/209; 710/104
See application file for complete search history.

(56) References Cited

U.S. PATENT DOCUMENTS

| | | | |
|---|---|---|---|
| 6,069,929 A * | 5/2000 | Yabe et al. ................. 375/368 |
| 6,666,702 B1* | 12/2003 | Pickles ........................ 439/328 |
| 6,724,329 B2* | 4/2004 | Casper ........................ 341/106 |
| 6,760,793 B2* | 7/2004 | Kelley et al. ................. 710/52 |
| 6,839,788 B2* | 1/2005 | Pecone ........................ 710/305 |
| 6,907,510 B2* | 6/2005 | Bennett et al. .............. 711/202 |
| 2003/0185308 A1* | 10/2003 | Schoenborn ................. 375/257 |
| 2004/0047434 A1* | 3/2004 | Waltho ........................ 375/308 |
| 2004/0057509 A1* | 3/2004 | Porat et al. .................. 375/222 |
| 2004/0090928 A1* | 5/2004 | Drottar et al. .............. 370/310 |

* cited by examiner

Primary Examiner—A. Elamin
(74) Attorney, Agent, or Firm—Blakely, Sokoloff, Taylor & Zafman LLP

(57) ABSTRACT

An apparatus and method for low latency power management on a serial data link are described. In one embodiment, the method includes the detection of an electrical idle exit condition during receiver operation in an electrical idle state. Once detected, data synchronization is performed according to one or more received data synchronization training patterns. Finally, when the synchronization is performed within a determined synchronization re-establishment period, the receiver will resume operation according to a normal power state. Accordingly, the embodiment described illustrates an open loop, low latency power resumption operation for power management within 3GIO links.

39 Claims, 11 Drawing Sheets

3G10 CLIENT CONFIGURATION 400

POWER MANAGEMENT SQUELCH SIGNAL

ELECTRONIC SYSTEM 700

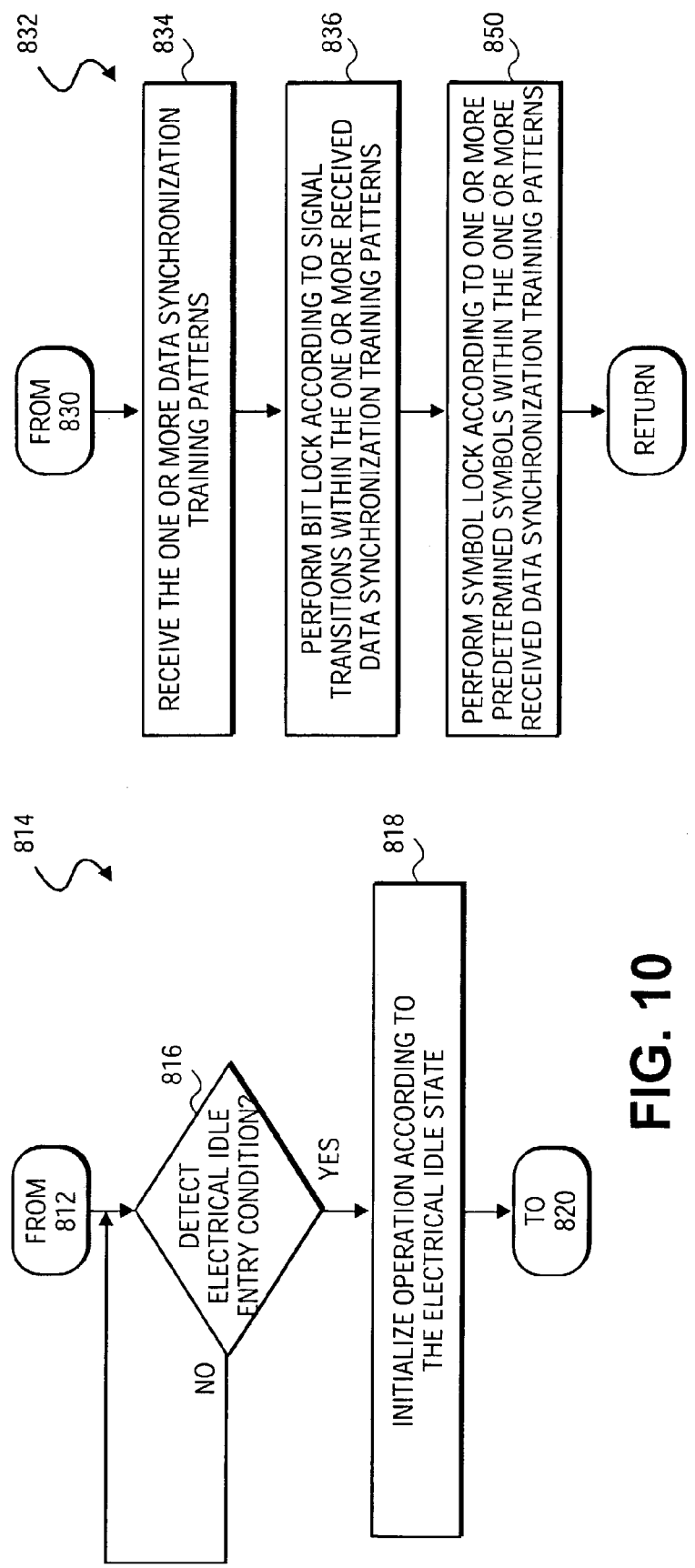

US 7,203,853 B2

APPARATUS AND METHOD FOR LOW LATENCY POWER MANAGEMENT ON A SERIAL DATA LINK

FIELD OF THE INVENTION

One or more embodiments of the invention relate generally to the field of third generation input/output (3GIO) interconnection. More particularly, one or more of the embodiments of the invention relates to a method and apparatus for low latency power management on a serial data link.

BACKGROUND OF THE INVENTION

During the past decade, peripheral component interconnect (PCI) has provided a very successful general purpose input/output (I/O) interconnect standard. PCI is a general purpose I/O interconnect standard that utilizes PCI signaling technology, including a multi-drop, parallel bus implementation. Unfortunately, traditional multi-drop parallel bus technology is approaching its practical performance limits. In fact, the demands of emerging and future computing models will exceed the bandwidth and scalability limits that are inherent in multiple drop, parallel bus implementations.

Accordingly, it is clear that meeting future system performance needs requires I/O bandwidth that can scale with processing and application demands. Alongside these increasing performance demands, the enterprise server and communication markets require improved liability, security and quality of service guarantees. Fortunately, technology advances and high speed point-to-point interconnects are enabling system designers to break away from the bandwidth limitations of multiple drop, parallel buses. To this end, system designers have discovered a high-performance, third generation I/O (3GIO) interconnect that will serve as a general purpose I/O interconnect for a wide variety of future computing and communications platforms.

3GIO comprehends the many I/O requirements presented across the spectrum of computing and communications platforms and rolls them into a common scalable and extensible I/O industry specification. One implementation of 3GIO is the PCI Express specification. The PCI Express basic physical layer consists of a differential transmit pair and a differential receiver pair. As such, dual simplex data on these point-to-point connection is self-clocked and its bandwidth increases linearly with interconnect width and frequency. In addition, PCI Express also provides a message space within its bus protocol that is used to implement legacy side band signals. As a result, a further reduction of signal pins produces a very low pin count connection for components and adapters.

Unfortunately, the use of a differential transmit pair and differential receive pair is a drastic deviation from traditional PCI. As a result, management of the serial data links between transmit and receiver pairs utilizing traditional closed loop signaling may exceed the amount of latency tolerated by PCI Express. Moreover, power management envisioned using PCI Express cannot be supported utilizing traditional PCI techniques. Therefore, there remains a need to overcome one or more of the limitations in the above-described, existing art.

BRIEF DESCRIPTION OF THE DRAWINGS

The various embodiments of the present invention are illustrated by way of example, and not by way of limitation, in the figures of the accompanying drawings and in which:

FIG. 10 depicts a flowchart illustrating an additional method for entering an electrical idle state, in accordance with a further embodiment of the present invention.

FIG. 11 depicts a flowchart illustrating an additional method for performing data synchronization during an L0s power management state, in accordance with the further embodiment of the present invention.

DETAILED DESCRIPTION

Figure 1:
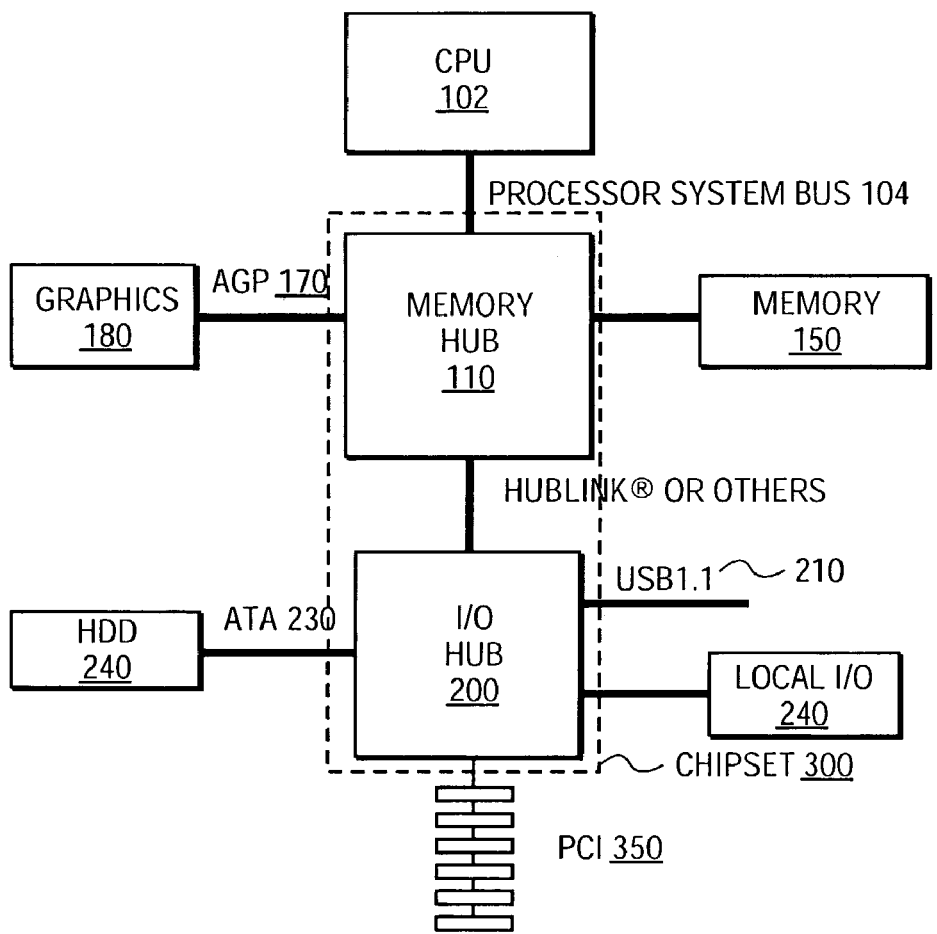
FIG. 1 depicts a block diagram illustrating a conventional client configuration utilizing a peripheral component interconnect (PCI) parallel, multi-drop bus.

A method and apparatus for low latency power management on a serial data link are described. In one embodiment, the method includes the detection of an electrical idle exit condition during receiver operation in an electrical idle state. Once detected, data synchronization is performed according to one or more received data synchronization training patterns. Finally, when the synchronization is performed within a determined synchronization re-establishment period, the receiver will resume operation according to a normal power state. Accordingly, the embodiment described illustrates an open loop, low latency power resumption operation for power management within 3GIO links.

In the following description, for the purposes of explanation, numerous specific details are set forth in order to provide a thorough understanding of the embodiments of the present invention. It will be apparent, however, to one skilled in the art that the various embodiments of the present invention may be practiced without some of these specific details. In addition, the following description provides examples, and the accompanying drawings show various examples for the purposes of illustration. However, these examples should not be construed in a limiting sense as they are merely intended to provide examples of the embodiments of the present invention rather than to provide an exhaustive list of all possible implementations of the embodiments of the present invention. In other instances, well-known structures and devices are shown in block diagram form in order to avoid obscuring the details of the various embodiments of the present invention.

Portions of the following detailed description may be presented in terms of algorithms and symbolic representations of operations on data bits. These algorithmic descriptions and representations are used by those skilled in the data processing arts to convey the substance of their work to others skilled in the art. An algorithm, as described herein, refers to a self-consistent sequence of acts leading to a desired result. The acts are those requiring physical manipulations of physical quantities. These quantities may take the form of electrical or magnetic signals capable of being stored, transferred, combined, compared, and otherwise manipulated. Moreover, principally for reasons of common usage, these signals are referred to as bits, values, elements, symbols, characters, terms, numbers, or the like.

However, these and similar terms are to be associated with the appropriate physical quantities and are merely convenient labels applied to these quantities. Unless specifically stated otherwise, it is appreciated that discussions utilizing terms such as "processing" or "computing" or "calculating" or "determining" or displaying" or the like, refer to the action and processes of a computer system, or similar electronic computing device, that manipulates and transforms data represented as physical (electronic) quantities within the computer system's devices into other data similarly represented as physical quantities within the computer system devices such as memories, registers or other such information storage, transmission, display devices, or the like.

The algorithms and displays presented herein are not inherently related to any particular computer or other apparatus. Various general purpose systems may be used with programs in accordance with the embodiments herein, or it may prove convenient to construct more specialized apparatus to perform the required method. For example, any of the methods according to the various embodiments of the present invention can be implemented in hard-wired circuitry, by programming a general-purpose processor, or by any combination of hardware and software.

One of skill in the art will immediately appreciate that the embodiments of the invention can be practiced with computer system configurations other than those described below, including hand-held devices, multiprocessor systems, microprocessor-based or programmable consumer electronics, digital signal processing (DSP) devices, network PCs, minicomputers, mainframe computers, and the like. The embodiments of the invention can also be practiced in distributed computing environments where tasks are performed by remote processing devices that are linked through a communications network. The required structure for a variety of these systems will appear from the description below.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the embodiments of the present invention may be practiced as well as implemented as an embodiment).

In an embodiment, the methods of the various embodiments of the present invention are embodied in machine-executable instructions. The instructions can be used to cause a general-purpose or special-purpose processor that is programmed with the instructions to perform the methods of the embodiments of the present invention. Alternatively, the methods of the embodiments of the present invention might be performed by specific hardware components that contain hardwired logic for performing the methods, or by any combination of programmed computer components and custom hardware components.

In one embodiment, the present invention may be provided as a computer program product which may include a machine or computer-readable medium having stored thereon instructions which may be used to program a computer (or other electronic devices) to perform a process according to one embodiment of the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

System Architecture

FIG. 1 depicts a block diagram illustrating a computer system 100, configured to utilize peripheral component interconnect (PCI) multiple drop buses. Computer system 100 comprises a processor system bus (front side bus) 104 for communicating information between a processor 102 and a memory hub 110, coupled together via the front side bus (FSB) 104. The computer system 100 also includes one or more temporary memory devices (memory) 150 coupled to memory hub 110 via memory bus 130. As described herein, memory 150 includes, but is not limited to, solid state memories, random access memories (RAM), synchronous RAM (SRAM), synchronous data RAM (SDRAM) or any device capable of supporting high speed buffering of data. In addition, the computer system may include one or more graphics devices 180 coupled to memory hub 110 via accelerated graphics port (AGP) 170.

Likewise, the computer system includes an input/output (I/O) subsystem comprised of I/O hub 200. As illustrated, the I/O hub 200 may be coupled, via an I/O bus 190, to memory hub 110. As illustrated, I/O hub 200 may be coupled to a universal serial bus (USB) 210, local I/O 230, as well as peripheral component interconnect devices (PCI) 350. Finally, the I/O hub 200 is also coupled to hard disk drive devices (HDD) 240 via an advanced technology attachment (ATA) bus 230.

As depicted in FIG. 1, the computer system 100 is illustrated in a client configuration. As illustrated, the PC platform computer system 100 supports a variety of application-specific buses alongside the PCI expansion bus 350, as illustrated in FIG. 1. Generally, the memory hub 110 and I/O hub 200 may form a system chipset 300, which communicates with the CPU 102. As illustrated in FIG. 1, the chipset 300 may be partitioned as a memory hub 110 and I/O hub 200, since the memory bus 130 often changes with each processor generation. Accordingly, one of the major functions of the chipset 300 is to isolate the ever-changing memory buses 130 from the stable I/O bus 190.

Within computer systems, for example as depicted in FIG. 1, the processor system bus, or FSB 200, continues to scale in both frequency and voltage at a rate that will continue for the foreseeable future. Likewise, memory bandwidths have increased to keep pace with the processor, such as central processor (CPU) 102. Consequently, in order to keep pace with processor speed, as well as to provide frequency and voltage scaling, computer system 100 may be reconfigured as a 3GIO client configuration 400, for example, as depicted with reference to FIG. 2.

As illustrated with reference to FIG. 2, system 400 includes chipset 300, as depicted in FIG. 1, as well as memory 150, graphics 180, HDD 240 and local I/O 250. However, AGP port 170, I/O bus 190 and local I/O bus 260 are replaced with a 3GIO bus 500, which is further illustrated with reference to FIG. 3. In addition, a switch 410 is provided, which replaces the multi-drop bus and is used to provide fan out for the 3GIO bus 500.

Accordingly, utilizing the 3GIO interconnect 500, client configuration 400 no longer uses parallel, multi-drop buses and therefore is able to scale with both frequency and voltage, while avoiding strict skew requirements between parallel signals, as well as side band signals, required for streaming data. As such, the 3GIO interconnect provides a unifying I/O interconnect technology for desktop, mobile, server, communication, platforms, workstations and embedded systems. However, as indicated above, 3GIO, or PCI Express, has very stringent power management requirements, which cannot be met utilizing closed loop signaling due to the reduced latency requirements of PCI Express.

Figure 3:
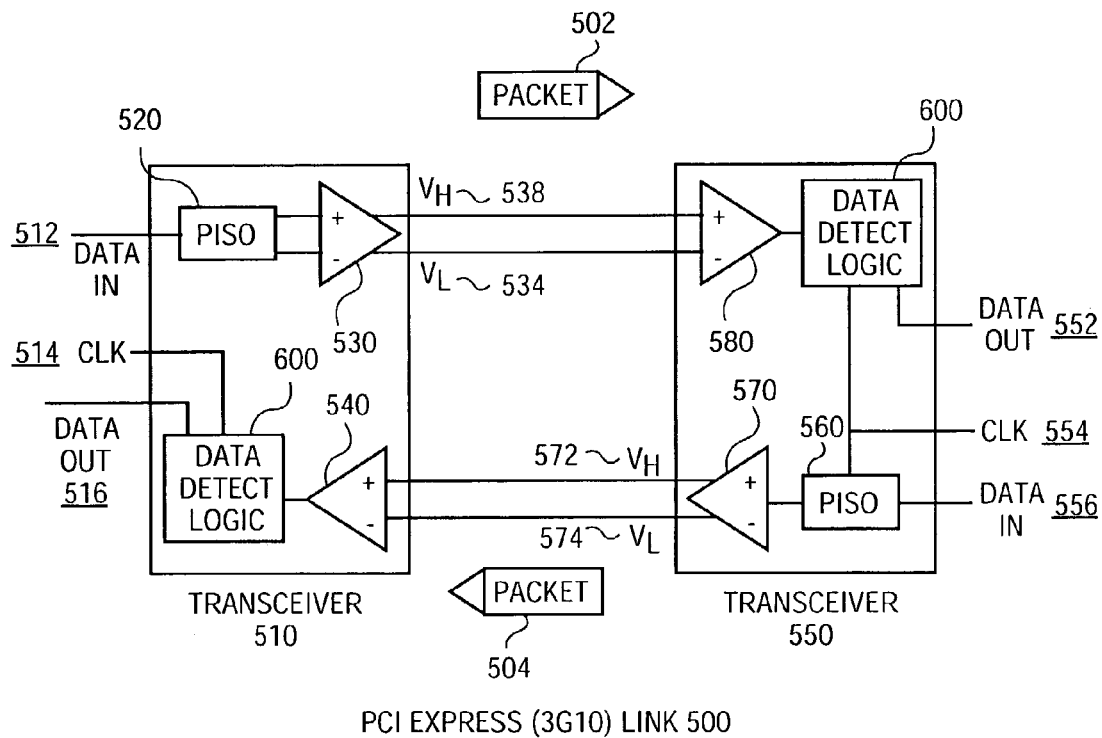
FIG. 3 depicts a block diagram illustrating a 3GIO/PCI Express link, in accordance with one embodiment of the present invention.

FIG. 3 depicts a PCI Express link 500 in accordance with one embodiment of the present invention. As depicted with reference to FIG. 3, the PCI Express link 500 represents a dual simplex communications channel between transceiver 510 and transceiver 550. The basic PCI Express link, as depicted in FIG. 3, includes two low voltage, differentially driven signal pairs, a transmit pair ($V_H$ 532 and $V_L$ 534) and a receive pair ($V_H$ 572 and $V_L$ 574). In addition, the PCI Express link 500 communicates via exchanged packets 502 and 504.

As illustrated, link 500 includes dual unidifferential links comprised of a driver and receiver pair 530 and 540 of transceiver 510, as well as a receiver and driver pair 580 and 570 of transceiver 550. In addition, a data clock is embedded using an 8b/10b encoding scheme to achiever very high data rates. In one embodiment, the transmitter and receiver lane pair may be implemented utilizing one of an AC coupled line and a DC terminated line. In an alternate embodiment, the transmitter and receiver lane pair may be implemented utilizing one of a DC coupled and a DC terminated line with a common mode of zero "0".

The definition of the 8b/10b transmission code is identical to that specified in ANSI X3.230-1994, Clause 11 (and also IEEE 802.3Z, 36.2.4, July 1998). Using this scheme, 8 bit characters and one control bit are treated as 3 bits and 5 bits, mapped onto a 4 bit group code and a 6 bit group code, respectively. The control bit, in conjunction with the data characters is used to identify when to encode one of the 12 special symbols included in the 8b/10b transmission (see Table 1). As such, these code groups are concatenated to form a 10 bit symbol, which is transmitted from a transmitter to a corresponding receiver via a dual differential link.

TABLE 1

| Encoding | Symbol | Name | Description |
| --- | --- | --- | --- |
| K28.5 | COM | Comma | Used for Lane and Link initialization and management |
| K27.7 | STP | Start TLP | Marks the start of a Transaction Layer Packet |
| K28.2 | SDP | Start DLLP | Marks the start of a Data Link Layer Packet |
| K29.7 | END | End | Marks the end of a Transaction Layer Packet or a Data Link Layer Packet |
| K30.7 | EDB | EnD Bad | Marks the end of a nullified TLP |
| K23.7 | PAD | Pad | Used in Framing and Link Width and Lane ordering negotiations |
| K28.0 | SKP | Skip | Used for compensating for different bit rates for two communicating ports |
| K28.1 | FTS | Fast Training Sequence | Used within an ordered-set to exit from L0s to L0 |
| K28.7 | | | Reserved |
| K28.3 | IDL | Idle | Electrical idle symbol used in the electrical idle ordered set |
| K28.4 | | | Reserved |
| K28.6 | | | Reserved |
| K28.7 | | | Reserved |

8b/10b Control Characters

The 8b/10b code also provides a scheme which is DC balanced, indicating that the generated code stream, or bit stream, includes a balanced number of 1 and 0 bits. In addition, the code ensures a limited run length, such that no more than five consecutive ones, "1", or zeros, "0", and a guaranteed transition density which permits clock recovery from the data stream. In addition, the special (K) characters, as depicted with reference to Table 1, are useful as packet delimiters. Likewise, a subset of the special K characters, referred to as commas, are unique in that their bit pattern never occurs in a string of serialized data symbols, and hence, can be used to determine symbol boundaries at their receiving end.

Accordingly, the combination of these features allows the receiving end of an encoded 8b/10b data stream to extract the bit rate clock to determine symbol (and packet) boundaries and to detect most transmission errors. Likewise, 8b/10b codes include the concept of disparity, wherein the disparity of any block of data is defined as the difference between the number of ones and the number of zeros. As such, positive and negative refer to an excess of ones over zeros or zeros over ones, respectively. Consequently, the code scheme guarantees that an encoded symbol's disparity is always either zero (11111, 00000), plus two (111111, 0000) or −2(1111, 000000), which is quite useful for error detection. Using an 8b/10b code, power management within a serial data link, according to one embodiment of the present invention, is now described.

Power Management

In accordance with one embodiment of the present invention, PCI link 500 includes a low voltage, power management state (L0s), wherein a state of the output driver lines ($V_H$ and $V_L$) are driven to a DC (direct current) common mode (squelch voltage), which is referred to herein as "electrical idle". In the embodiments described, the L0s state is intended as a power saving state. Utilizing the L0s state allows a link 500 to quickly enter and recover from a power conservation or the electrical idle state without going through configuration and recovery states in order to re-establish the link. Generally, transceivers 510 and 550 enter the electrical idle state when an electrical idle ordered set is received during a normal operation state (L0), as described in further detail below. In one embodiment, the L0s state provides a power saving state, which includes low latency, for performing data synchronization in order to resume operation within the L0 normal operation state.

Referring again to FIG. 3, the PCI Express link 500 includes transceiver 510 and transceiver 550. As illustrated, transceiver 510 and transceiver 550 include transmitter and receiver lane pairs; namely, a first transmitter and receiver lane pair (first lane pair) is comprised of transmitter 530 and receiver 580, while a second transmitter and receiver lane pair (second lane pair) is comprised of receiver 540 and transmitter 570. As illustrated in further detail below, the first lane pair may operate in an electrical idle state, while the second lane pair operates in the L0 normal operation state. In doing so, unidirectional communication may be performed for exchanging data via the direction of first lane pair while saving energy otherwise utilized by the second lane pair.

Figure 4:
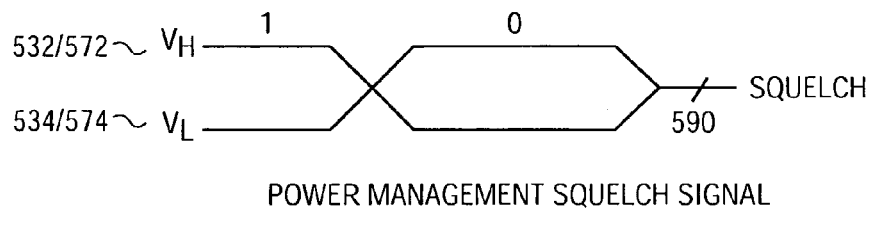
FIG. 4 depicts a power management squelch signal, in accordance with one embodiment of the present invention.

Referring again to FIG. 3, transceiver 510 and transceiver 550 include data detect logic, which includes bit/symbol receive circuitry, which is aligned to the incoming data 502/504 during link initialization. Accordingly, in one embodiment, data detect logic 600 is required to perform data synchronization, including bit lock, as well as symbol lock, within a limited amount of time in order to provide low latency resumption from the L0s of the L0 normal operation state. As illustrated with reference to FIG. 4, the electrical idle state may consist of the output driver differential signal pairs $V_H$ and $V_L$ being driven to a DC common mode, or squelch voltage 590.

In one embodiment, the transceiver 510/550 may be directed to enter the L0s power management state. In response, the transceiver 510/550 will transmit an electrical idle ordered set to the corresponding receiver 580/540. Once transmitted, the output driver drives the differential output pair ($V_L$ and $V_H$) to the squelch voltage 590 in order to conserve power. In one embodiment, PCI link 500 also supports additional power management states, which provide additional power savings at the cost of increased latency for resumption of the L0 normal power state. Generally, the additional power management states will require entry into at least a recover state in order to realign the bit/symbol receive circuitry 600.

In contrast, within the L0s power management state, the data detect logic 600 is required to perform data synchronization according to a training set count received during an initial data synchronization training pattern. For example, in one embodiment, initial configuration of a link requires exchange of various training pattern information. For example, as illustrated with reference to Table 1, Table 1 provides various 8b/10b encoding symbols, which may be utilized and transmitted between transmitter and receiver pairs in order to perform bit synchronization, as well as symbol alignment, for proper exchange of data.

TABLE 2

| Symbol Number | Allowed Values | Encoded Values | Description |
|---|---|---|---|
| 0 | | K28.5 | COMMA code group for symbol alignment |
| 1 | 0–255 | D0.0–D31.7, K23.7 | Link Number within component |
| 2 | 0–31 | D0.0–D 31.0, K23.7 | Lane Number within Port |
| 3 | 0–255 | D0.0–D31.7 | N_FTS. This is the number of fast training ordered-sets required by the receiver to obtain reliable bit and symbol lock. |
| 4 | 1 | D1.0 | Data Rate Identifier Bit 0–1 Reserved, set to 0 Bit 1 = 1, generation 1 (2.5 Gb/s data rate supported Bit 2:7-Reserved, set to 0 |
| 5 | Bit 0 = 0, 1 Bit 1 = 0, 1 Bit 2 = 0, 1 Bit 3 = 0, 1 Bit 4:7 = 0 | D0.0, D1.0, D2.0, D4.0, D8.0 | Link Control Bit 0 = 0, De-assert Reset Bit 0 = 1, Assert Reset Bit 1 = 0, Enable Link Bit 1 = 1, Disable Link Bit 2 = 0, No Loopback Bit 2 = 1, Enable Loopback Bit 3 = 0, Enable Scrambling Bit 3 = 1, Disable Scrambling Bit 4:7, Reserved |
| 6–15 | | D10.02 | TS1 Identifier |

TS1 Ordered-Set

TABLE 3

| Symbol Number | Allowed Values | Encoded Values | Description |
|---|---|---|---|
| 0 | | K28.5 | COMMA code group for symbol alignment |
| 1 | 0–255 | D0.0–D31.7, K23.7 | Link Number within component |
| 2 | 0–31 | D0.0–D 31.0, K23.7 | Lane Number within Port |
| 3 | 0–255 | D0.0–D31.7 | N_FTS. This is the number of fast training ordered-sets required by the receiver to obtain reliable bit and symbol lock. |
| 4 | 1 | D1.0 | Data Rate Identifier Bit 0–1 Reserved, set to 0 Bit 1 = 1, generation 1 (2.5 Gb/s data rate supported Bit 2:7-Reserved, set to 0 |
| 5 | Bit 0 = 0, 1 Bit 1 = 0, 1 | D0.0, D1.0, D2.0, D4.0, | Link Control Bit 0 = 0, De-assert Reset |

TABLE 3-continued

| Symbol Number | Allowed Values | Encoded Values | Description |
| --- | --- | --- | --- |
| | Bit 2 = 0, 1<br>Bit 3 = 0, 1<br>Bit 4:7 = 0 | D8.0 | Bit 0 = 1, Assert Reset<br>Bit 1 = 0, Enable Link<br>Bit 1 = 1, Disable Link<br>Bit 2 = 0, No Loopback<br>Bit 2 = 1, Enable Loopback<br>Bit 3 = 0, Enable Scrambling<br>Bit 3 = 1, Disable Scrambling<br>Bit 4:7, Reserved |
| 6–15 | | D5.2 | TS2 Identifier |

TS2 Ordered-Set

During link initialization, transmitter and receiver lane pairs may exchange training sequence-ordered sets, for example, training sequence-ordered set 1 (TS1), as depicted with reference to Table 2, as well as training sequence-ordered set 2 (TS2), as depicted with reference to Table 3. The training sequences are generally composed of ordered sets used for bit alignment and symbol alignment and to exchange physical layer parameters. Within the training ordered sets, a training set count (N FTS) value is exchanged. This value is the number of fast training sequence (FTS) ordered sets required by the receiver to obtain bit and symbol lock during the L0s power management to resume operation according to the L0 normal state. Accordingly, the N_FTS value is saved by the receiver in order to determine a symbol re-establishment period.

Figure 5:
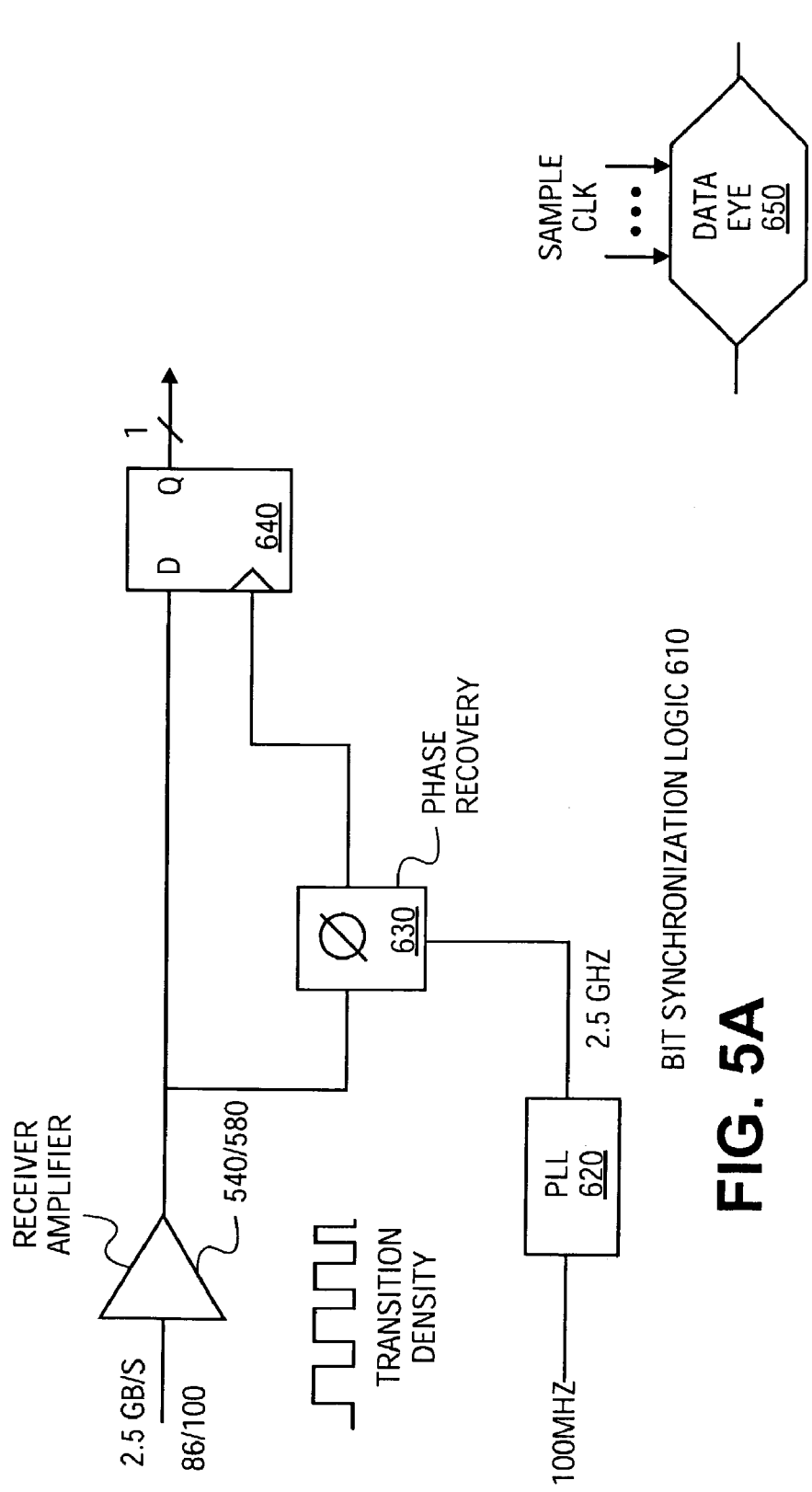
FIG. 5A depicts a block diagram illustrating bit synchronization logic contained within data detect logic of the 3GIO link, as depicted with reference to FIG. 3, in accordance with the further embodiment of the present invention.
FIG. 5B depicts phase alignment with a data eye, in accordance with the further embodiment of the present invention.

For example, as depicted with reference to FIG. 5A, FIG. 5A depicts bit synchronization logic 610 of data detect logic 600, as depicted in FIG. 3. As indicated above, in one embodiment, a transmitter and receiver lane pair may enter into the electrical idle state (L0s) when the differential output lane pairs are driven to the DC common mode voltage or squelch voltage 590, as illustrated with reference to FIG. 4. In one embodiment, entry into the L0s power management state is initialized when then transmitter is directed to enter into the electrical idle state. Once such a direction is received, the transmitter transmits an electrical idle ordered set to its corresponding receiver. In one embodiment, the electrical idle ordered set is comprised of a K28.5 control character followed by three K28.3 (IDL) control characters, as depicted with reference to Table 1. Once transmitted, the transmitter will drive its output pair to a squelch voltage 590, as depicted with reference to FIG. 4.

In response to detection of an electrical idle ordered set, the receiver will enter into the electrical idle state for at least a predetermined period of time. During the electrical idle period, the data detect logic 600, as depicted with reference to FIG. 3, will generate fall out of alignment with received data bits, as well as losing symbol alignment with respect to received data packets. Accordingly, in one embodiment, a fast training sequence or FTS ordered set is exchanged during the electrical idle state L0s. In one embodiment, the FTS order set is comprised of the following 8b/10b control characters; namely, a K28.5 control character (COM) followed by three K28.1 control characters (FTS), as depicted with reference to Table 1.

In one embodiment, the transmitter of the transmitter and receiver lane pair is responsible for transmitting one or more FTS ordered sets, as indicated by the initially exchanged N_FTS value, once an electrical idle exit condition is detected. In one embodiment, the transmitter is directed to exit electrical idle. Once directed, the transmitter will drive the output lines to a normal voltage. In response, the receiver detects the voltage change as the electrical idle exit condition. Next, the transmitter sends N_FTS FTS ordered set(s) to the receiver. As such, utilizing the received FTS ordered sets, phase recovery logic 630 utilizes, for example, a phase based aligner to reacquire bit lock.

In one embodiment, phase recovery unit 630 samples "N" arbitrary bits of a received FTS ordered set to determine edge placement of the sample. By detecting a delta (Δ) between two consecutive samples, for example, as depicted with reference to FIG. 5B, it is assumed that an edge lies between the two samples. Accordingly, by keeping track of the number of edges determined to be to the left or to the right of the Δ, the phase is adjusted until an equal number of edges fall to the left and right of the Δ.

Therefore, in one embodiment, the sample clock of the bit synchronization logic 610 is able to align with the data eye 650, as depicted with reference to FIG. 5B. In other words, the phase recovery unit 630 attempts to position data clock to the incoming data. Once this is performed, bit lock is established. As such, the phase recovery unit 630 is able to clock data output logic 640 at the center, or data eye, of received bit patterns. However, to complete data synchronization, symbol synchronization is also required.

Figure 6:
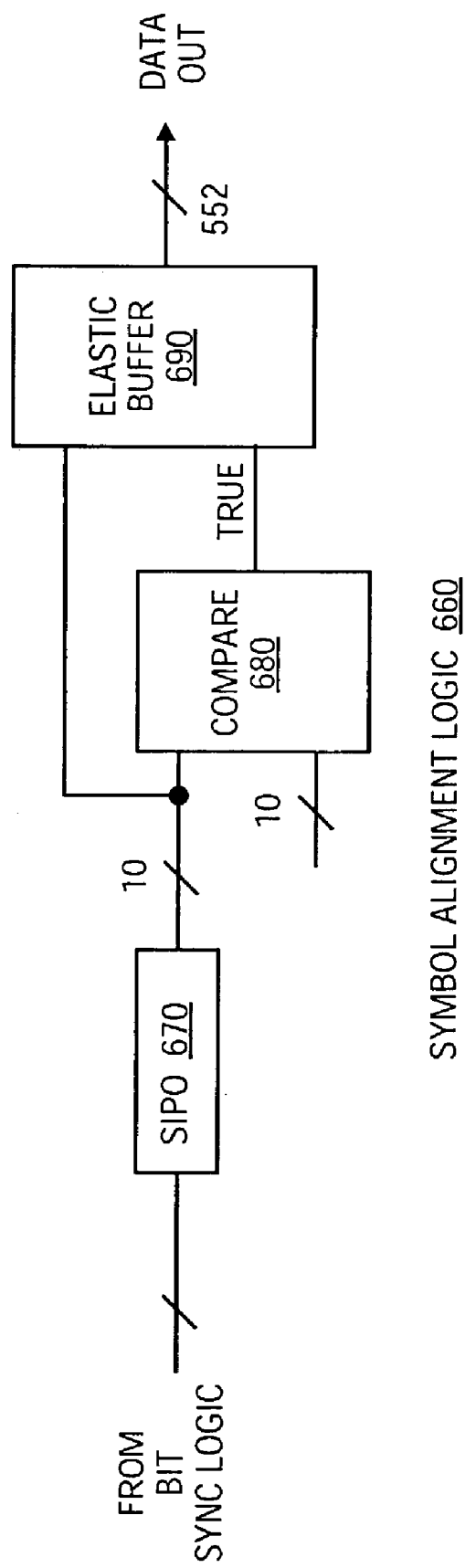
FIG. 6 depicts symbol alignment logic utilized within data detect logic of the 3GIO link, as depicted with reference to FIG. 3, in accordance with the further embodiment of the present invention.

Accordingly, as depicted with reference to FIG. 6, FIG. 6 depicts symbol alignment logic 660. As described above, in one embodiment, the received FTS ordered set is comprised of a K28.5 control character followed by three K28.1 control characters. As such, a single in, parallel out (SIPO) unit 670 receives data from bit synchronization logic 610. Next, the symbols are compared to a known symbol, which matches the K28.5 control character, or comma symbol. Once detected, data contained within elastic buffers 690 is clocked to the data out 552, as illustrated with reference to FIG. 3. Once the symbol detection pattern, or comma symbol, is detected, symbol alignment is achieved, resulting in complete data synchronization.

However, in order to comply with the low latency requirements for resumption of L0 normal operation from the L0s power management state, data synchronization is required to be performed within a predetermined amount of time or synchronization re-establishment period. In one embodiment, the re-establishment period is calculated according to the received N_FTS value according to the following equation:

$$\text{synchronization re-establishment period} = N \times N\_FTS \times 10 \times UI \quad (1)$$

where N is equal to the number of symbols within the FTS training patterns, while N FTS refers to the exchanged N_FTS value and UI refers a unit interval, indicating a value measured by averaging a time interval between voltage transitions over a time interval long enough to make all intentional frequency modulation of a source clock negligible.

As such, in one embodiment, once the receiver detects an electrical idle exit condition, for example, using a squelch voltage detector, the receiver begins, or initiates, a timer. This timer is stopped once data synchronization is complete. Until data synchronization is complete, the timer value is compared to the synchronization re-establishment period. Once data synchronization is complete, the transmitter and receiver lane pair resumes the L0 normal operation state.

Otherwise, the transmitter and receiver pair enter a recovery state in order to re-align the receiver bit/symbol receive circuitry when the timer exceeds the synchronization re-establishment period, prior to completion of data synchronization.

Figure 2:
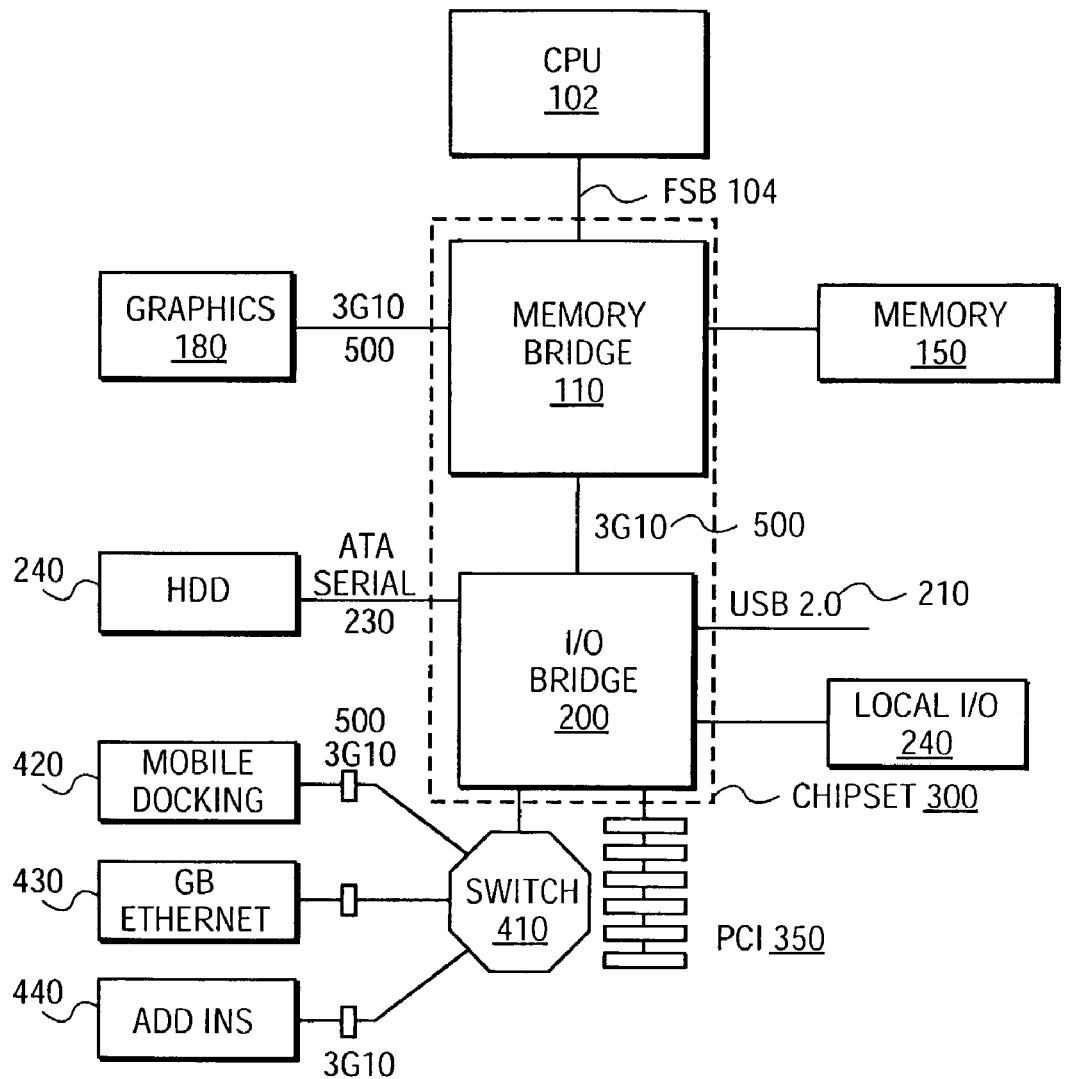
FIG. 2 depicts a block diagram illustrating a computer system utilizing 3GIO interconnects, in accordance with one embodiment of the present invention.
Figure 7:
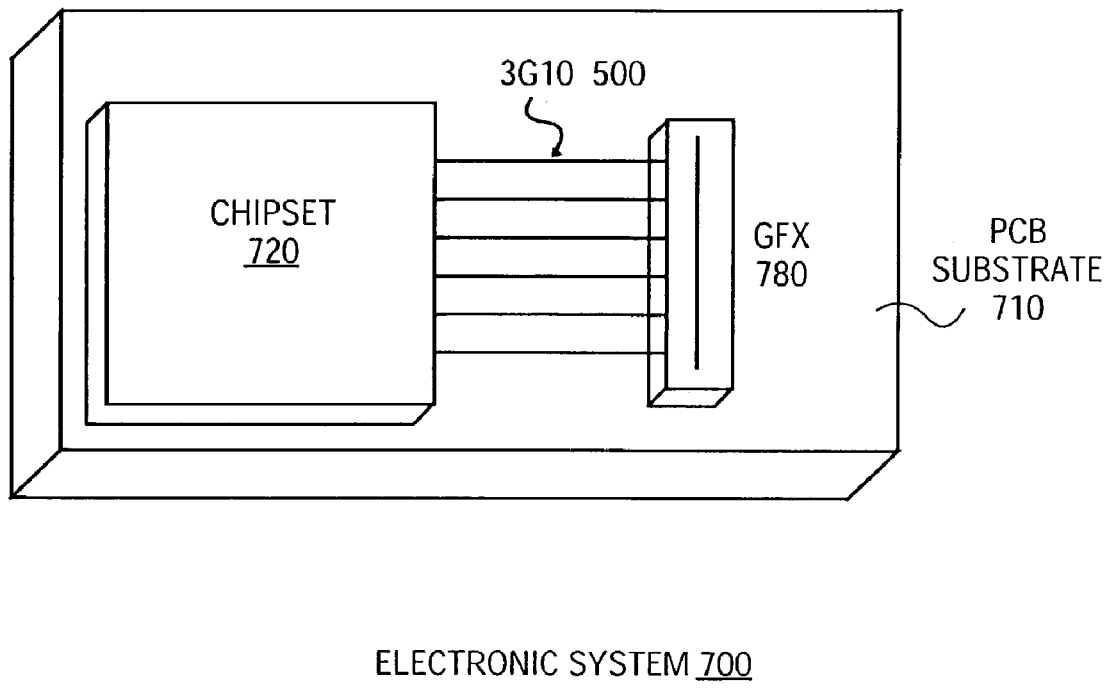
FIG. 7 depicts an electronic system, which utilizes a 3GIO interconnect, in accordance with the further embodiment of the present invention.

Referring now to FIG. 7, FIG. 7 depicts a block diagram illustrating an electronic system 700, which utilizes one or more 3GIO interconnects between a chipset 720 and a coupled hardware device 780, such as for example, graphics (GFX) 180, as depicted with reference to FIG. 2. As illustrated, chipset 720 is installed onto printed circuit board (PCB) 710. In one embodiment, installation of the chipset 720 may be done via one of a service-mount attachment, a through-hole attachment technique, or via a connector socket.

In one embodiment, the chipset may be configured as a memory controller hub or I/O controller hub, for example, as depicted with reference to FIGS. 1 and 2. Likewise, electronic system 700 includes a hardware application, for example, graphics application 180, as depicted with reference to FIGS. 1 and 2. As illustrated, GFX application 780 is also installed onto PCB 680 via, for example, a service-mount or through-hole attachment technique, or via connector socket. However, in contrast to conventional chipsets, chipset 720 communicates with graphics application 780 via a plurality of 3GIO interconnects 500, for example, high speed buses.

As depicted with reference to FIG. 7, electronic system 700 may also include a fabricated processor, as well as an I/O hub, for example, as depicted with reference to FIGS. 1 and 2. In one embodiment, 3GIO interconnects are fabricated onto PCB 710. In one embodiment, the utilization of the 3GIO interconnect 500 enables a transmitter and receiver lane pair, in one direction, to operate within the L0s power management state, while an opposite transmitter and receiver lane pair direction operates according to the L0 normal operation state.

As such, unidirectional communication is enabled, while avoiding wasted voltage consumed by bi-directional activation when only unidirectional information is exchanged. Likewise, assuming data communication direction changes, the 3GIO interconnect 500 is able to resume the L0 normal power management state with the minimum latency defined by the synchronization re-establishment period calculated according to the exchanged N_FTS value. Procedural methods for implementing the embodiments of the present invention are now described.

Operation

Figure 8:
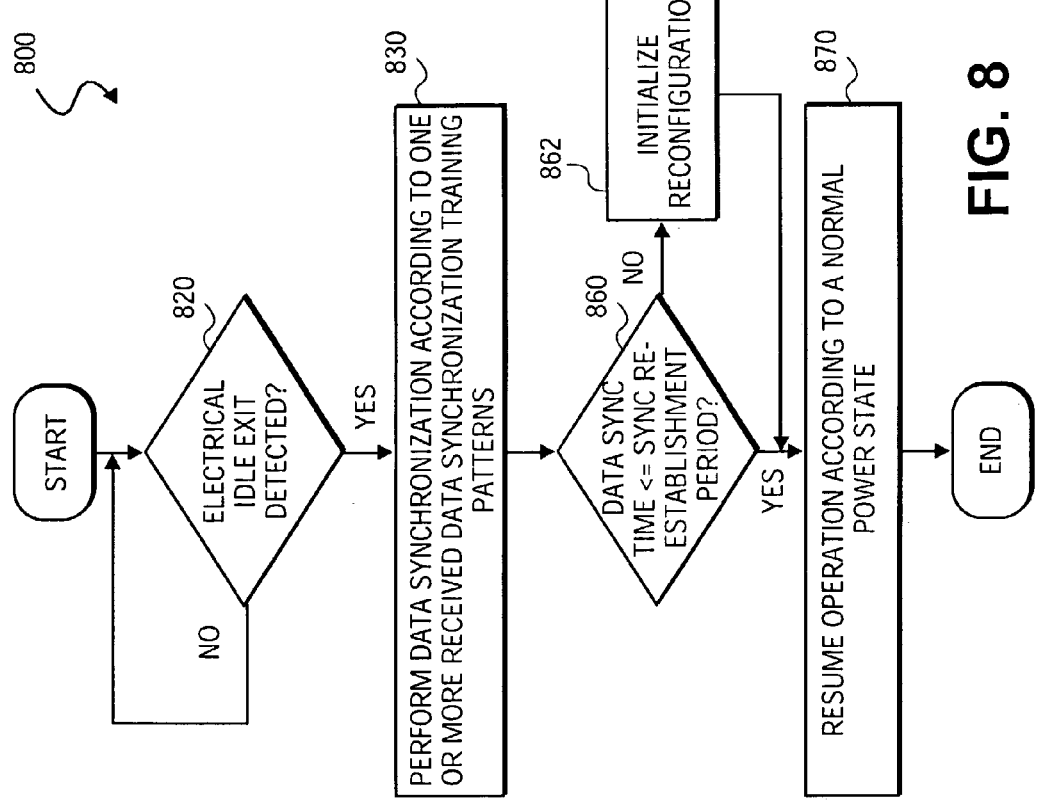
FIG. 8 depicts a flowchart illustrating a method for low latency power management of a serial data link, in accordance with one embodiment of the present invention.

Referring now to FIG. 8, FIG. 8 depicts a flowchart illustrating a method 800 for low latency power management of a serial data link, for example, a 3GIO link, as depicted with reference to FIG. 7, and in accordance with one embodiment of the present invention. As described above, a serial data link, or 3GIO link, for example, 3GIO link 500, as depicted with reference to FIG. 3, supports a power management state (L0s) wherein the output driver lines between a transmitter and receiver pair are driven to a DC or common mode squelch voltage, for example, as depicted with reference to FIG. 4.

In one embodiment, the L0s power management state enables power conservation while supporting low latency resumption of the L0 normal power management state. In one embodiment, the output driver lines between transmitter and receiver pairs are driven back to the normal voltage level to resume the L0 state. Accordingly, as depicted with reference to FIG. 8, resumption of a receiver from a L0s power management state to a normal power state L0 is now described.

At process block 820, it is determined whether electrical idle exit is detected. In one embodiment, electrical idle exit is detected once the output driver lines are driven from the squelch voltage to the normal voltage level. Once the electrical idle exit is detected, at process block 830, a receiver of a transmitter and receiver lane pair performs data re-synchronization according to one or more received data synchronization training patterns utilizing, for example, 8b/10b code control characters, for example, as depicted with reference to Table 1. Once data synchronization is performed, at process block 860, it is determined whether a time required to perform data synchronization is less than or equal to a synchronization re-establishment period.

In one embodiment, the synchronization re-establishment period is calculated in order to ensure that a serial data link resumes a normal power state from the L0s power management state within a minimum latency period. As such, when a data synchronization time is less than or equal to the synchronization re-establishment period, at process block 870, the transmitter and receiver lane pair resume operation according to a normal power state L0. Otherwise, at process block 862, the receiver transmitter pair performs initialization reconfiguration in order to re-establish data synchronization to enable normal data processing within the link.

Figure 9:
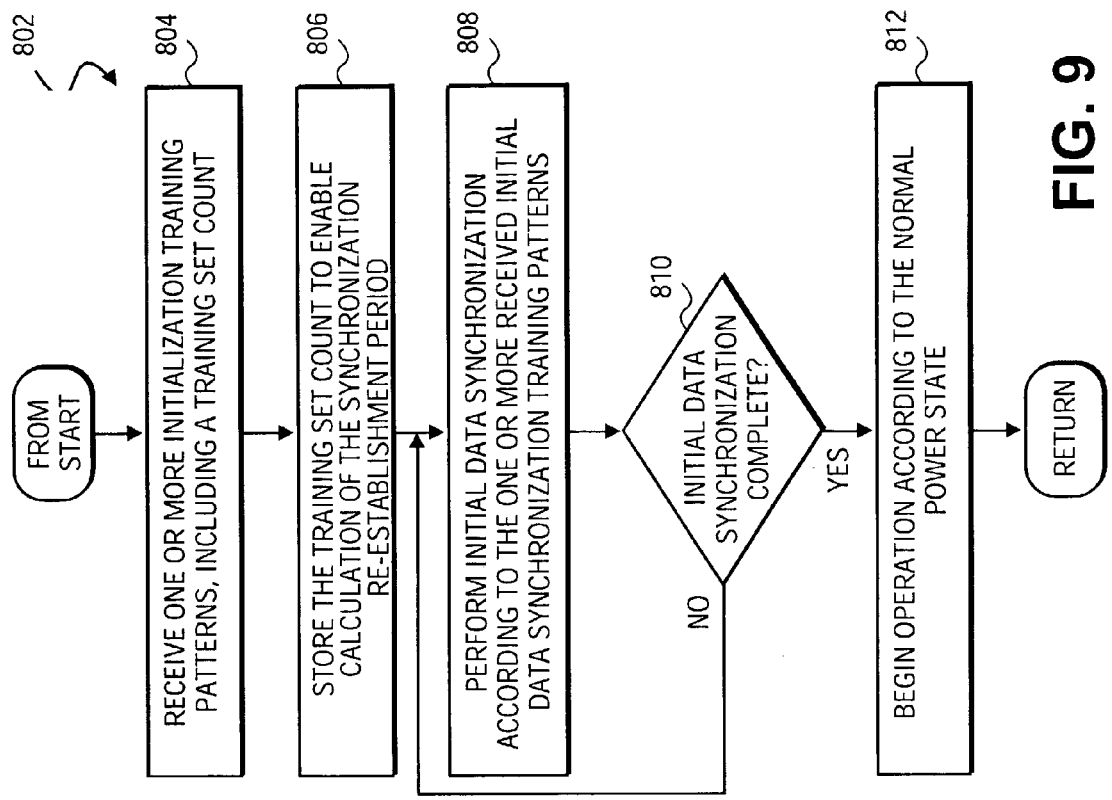
FIG. 9 depicts a flowchart illustrating an additional method for performing data initialization, synchronization within a 3GIO data link, in accordance with a further embodiment of the present invention.

Referring now to FIG. 9, FIG. 9 depicts a flowchart illustrating an additional method 802 for performing initial data synchronization within a transmitter and receiver lane pair, for example, as depicted with reference to FIG. 3, and in accordance with the further embodiment of the present invention. At process block 804, a receiver receives one or more initialization training patterns, including a training set count. Once received, at process block 806, the receiver stores the training set count to enable calculation of the synchronization re-establishment period. Calculation of the synchronization re-establishment period is described with reference to FIG. 17 below.

Next, at process block 808, the receiver performs initial data synchronization according to the one or more received initial data synchronization training pattern. As described above, in one embodiment, the data synchronization training patterns are comprised of 8b/10b encoded control characters, which include a limited run length as well as control symbols, which enable bit synchronization as well as symbol synchronization. At process block 810, it is determined whether initial data synchronization is complete. Once completed, at process block 812, the receiver and transmitter lane pair begin operation according to the L0 normal power state.

Referring now to FIG. 10, FIG. 10 depicts a flowchart illustrating an additional method 814 for operation within the L0 normal power state of process block 812, as depicted in FIG. 9 and in accordance with the further embodiment of the present invention. At process block 816, it is determined whether the receiver detects an electrical idle entry condition. In one embodiment, the electrical idle entry condition is detected in response to the receipt of an electrical idle ordered set, for example, as described above, with reference to control characters depicted in Table 1. Once the electrical idle exit condition is detected, process block 818 is performed. At process block 818, the receiver initializes operation according to the electrical idle state. Once performed, control flow branches to process block 820, as depicted with reference to FIG. 8.

Referring now to FIG. 11, FIG. 11 depicts a flowchart illustrating an additional method 832 for performing data synchronization according to one or more received data synchronization training patterns of process block 830, as depicted with reference to FIG. 8 and in accordance with the further embodiment of the present invention. At process block 834, a receiver receives the one or more data synchronization training patterns. Once received, at process block 836, the receiver performs bit lock according to signal transitions within the one or more received data synchronization training patterns. Finally, at process block 850, the receiver performs symbol lock according to one or more predetermined symbols within the one or more received data synchronization training patterns.

In one embodiment, the data synchronization training patterns are comprised of a K28.5 control character (COM), followed by three K28.1 control characters (FTS), as depicted with reference to Table 1. As indicated above, in one embodiment, the data synchronization training patterns are comprised of a fast training set ordered set, or FTS ordered set, comprised of the indicated control characters, which enable performance of bit lock and symbol lock within a minimum amount of time to comply with latency requirements of 3GIO serial data links.

Figure 12:
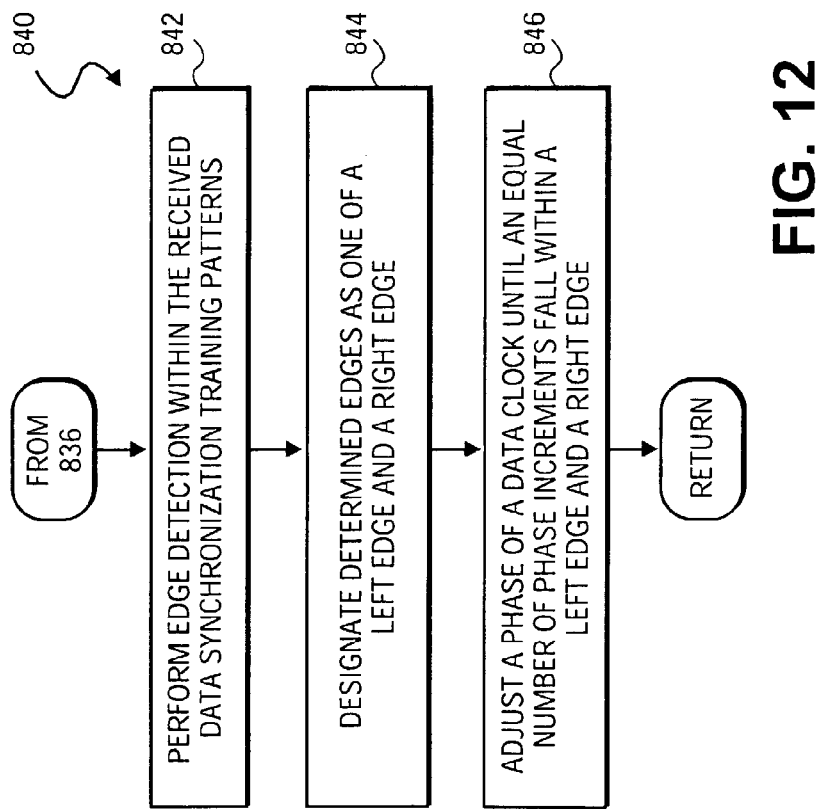
FIG. 12 depicts a flowchart illustrating an additional method for performing bit lock during data synchronization, in accordance with the further embodiment of the present invention.

Referring now to FIG. 12, FIG. 12 depicts a flowchart illustrating an additional method 840 for performing bit lock of process block 836, as depicted with reference to FIG. 11, in accordance with the further embodiment of the present invention. At process block 842, the receiver performs edge detection with the received data synchronization training patterns. Once performed, at process block 844, the receiver designates determined edges as one of a left and a right edge. Finally, at process block 846, the receiver adjusts a phase of a data clock into an equal number of phase increments fall within a left edge and a right edge.

For example, as depicted with reference to FIGS. 5A and 5B, bit synchronization logic 610 of 3GIO link 500, as depicted with reference to FIG. 3, performs bit synchronization in order to align a receiver clock with a data eye 650. In the embodiments described, bit lock is performed utilizing tracking. However, bit synchronization may also be performed utilizing oversampling, as well as other synchronization techniques as known in the art. Consequently, during electrical idle, the bit/symbol receive circuitry of a receiver may fall out of alignment with incoming data.

However, depending on the length of the electrical idle state, L0s, the time required to reacquire bit lock, as well as symbol lock, is less than the amount of time required to establish initial bit lock and symbol synchronization since the bit/symbol received circuitry was previously aligned to the incoming data. Consequently, low latency resumption of the normal power state is performed by training the bit/symbol received circuitry utilizing FTS ordered sets, as described above.

Figure 13:
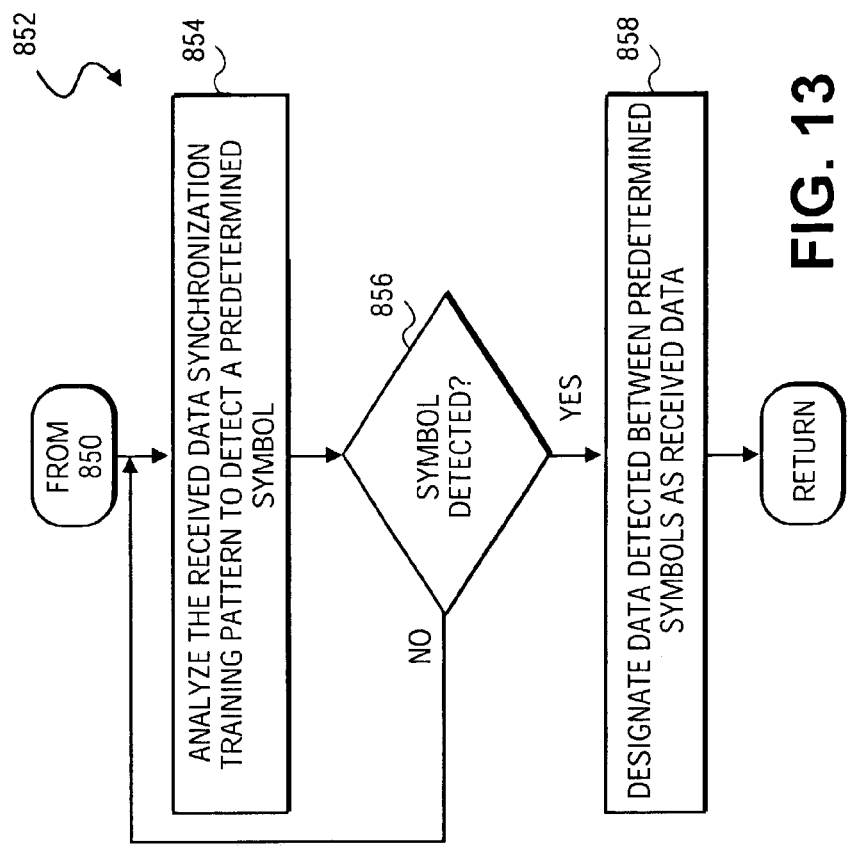
FIG. 13 depicts a flowchart illustrating an additional method for performing signal lock during data synchronization, in accordance with the further embodiment of the present invention.

Referring now to FIG. 13, FIG. 13 depicts a flowchart illustrating an additional method 852 for performing symbol synchronization of process block 850, as depicted in FIG. 11, and in accordance with the further embodiment of the present invention. At process block 854, the receiver analyzes the received data synchronization training patterns to detect a predetermined symbol. In one embodiment, the data synchronization training patterns are comprised of FTS ordered sets, including 8b/10b control characters, as depicted with reference to Table 1. Next, at process block 856, process block 854 is repeated until a symbol is detected.

Finally, at process block 858, the receiver designates data detected between predetermined symbols as received data and achieves symbol alignment. In one embodiment, symbol alignment is performed, as depicted with reference to FIG. 6, within symbol alignment logic 660, which compares the received FTS ordered set to a predetermined symbol, such as, for example, a K28.5 comma pattern. As indicated, the 8b/10b code supports control characters, such as the comma pattern, which it ensures will not be repeated within a data pattern. Consequently, the K28.5 comma symbols can be used to mark the boundaries of received data.

Figure 14:
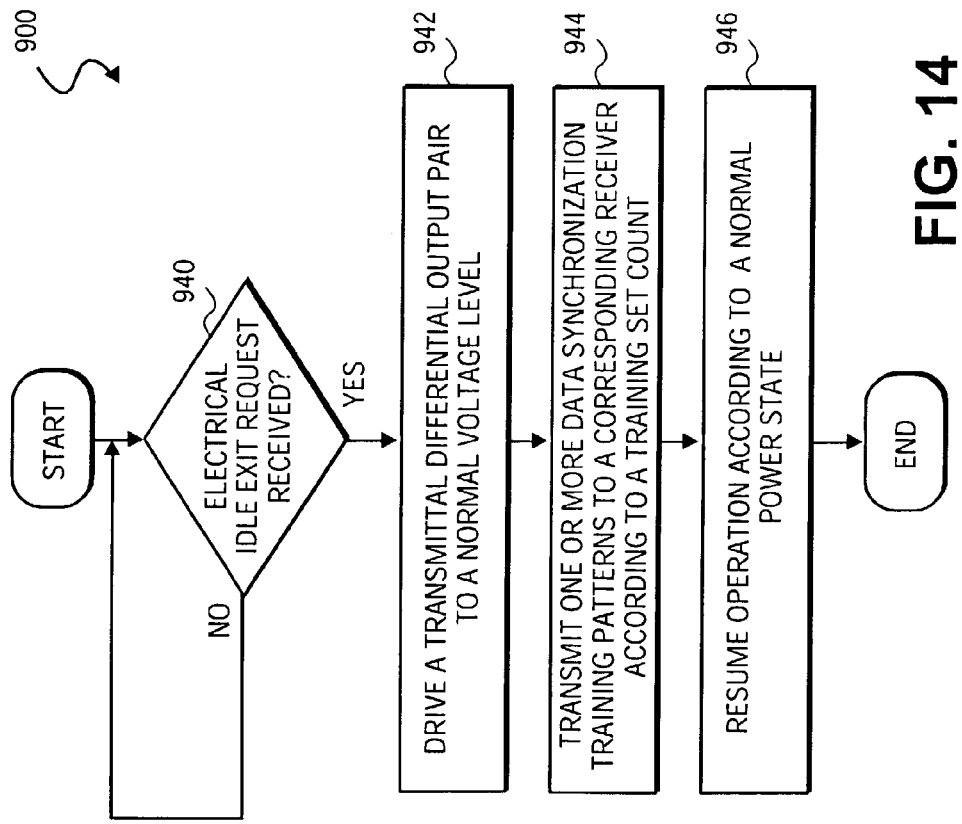
FIG. 14 depicts a flowchart illustrating a method for transmitting training pattern data to a receiver to enable low latency resumption of a normal power state, in accordance with one embodiment of the present invention.

Referring now to FIG. 14, FIG. 14 depicts a flowchart illustrating a method 900 for low latency resumption of a normal power state following operation within an electrical idle state within, for example, 3GIO link 500, as depicted with reference to FIG. 3, and in accordance with a further embodiment of the present invention. At process block 940, a transmitter receives, during operation, according to an electrical idle state, an electrical idle exit request. Once received, at process block 944, the transmitter drives a differential output pair from a squelch voltage to a normal voltage level, for example, as depicted with reference to FIG. 4.

Next, at process block 944, the transmitter transmits one or more data synchronization training patterns to a corresponding receiver according to a training set count. In one embodiment, the data synchronization training patterns are comprised of FTS ordered sets, including 8b/10b code control characters, as depicted with reference to Table 1. Once the one or more data synchronization training patterns are transmitted, process block 946 is performed following a predetermined period of time. Finally, at process block 946, the transmitter resumes operation according to a normal power state L0.

Figure 15:
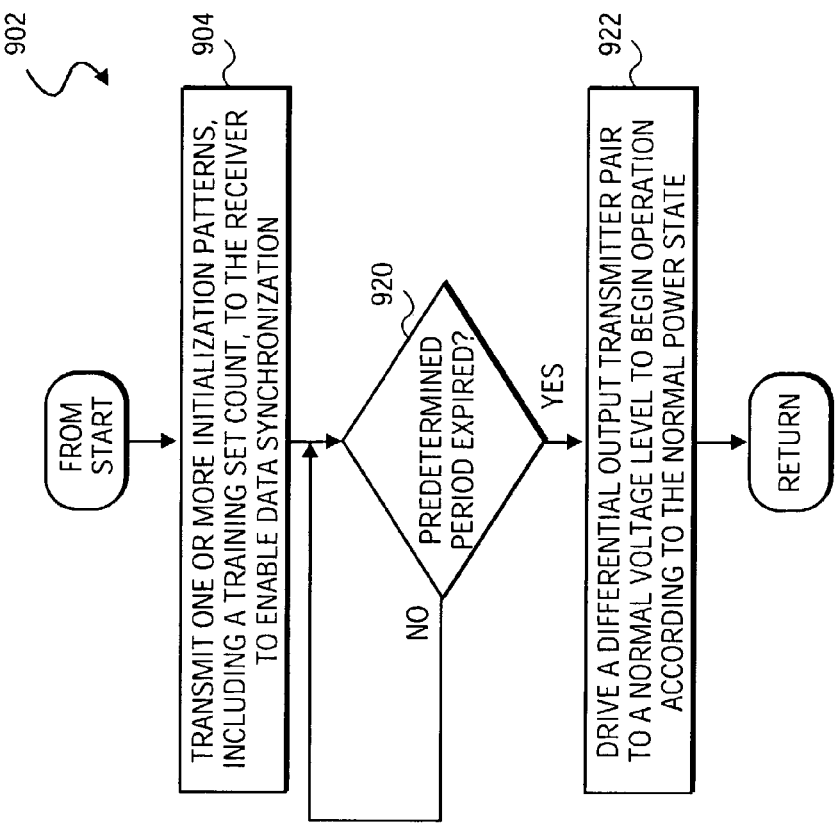
FIG. 15 depicts a flowchart illustrating an additional method for transmitting initialization training patterns to enable initial data synchronization by a receiver, in accordance with the further embodiment of the present invention.

Referring now to FIG. 15, FIG. 15 depicts a flowchart illustrating an additional method 902 for providing initialization training patterns to the corresponding receiver to enable initial data synchronization, in accordance with one embodiment of the present invention. At process block 904, a transmitter transmits one or more initialization training patterns to a corresponding receiver, including a training set count. As described above, the initialization training patterns enable a receiver to establish bit lock, as well as symbol synchronization in order to process received data packets during the normal L0 operation state. Following a predetermined period after transmitting the initialization training pattern, the transmitter drives a differential output transmitter pair to a normal voltage level to begin operation according to the normal power state.

Figure 16:
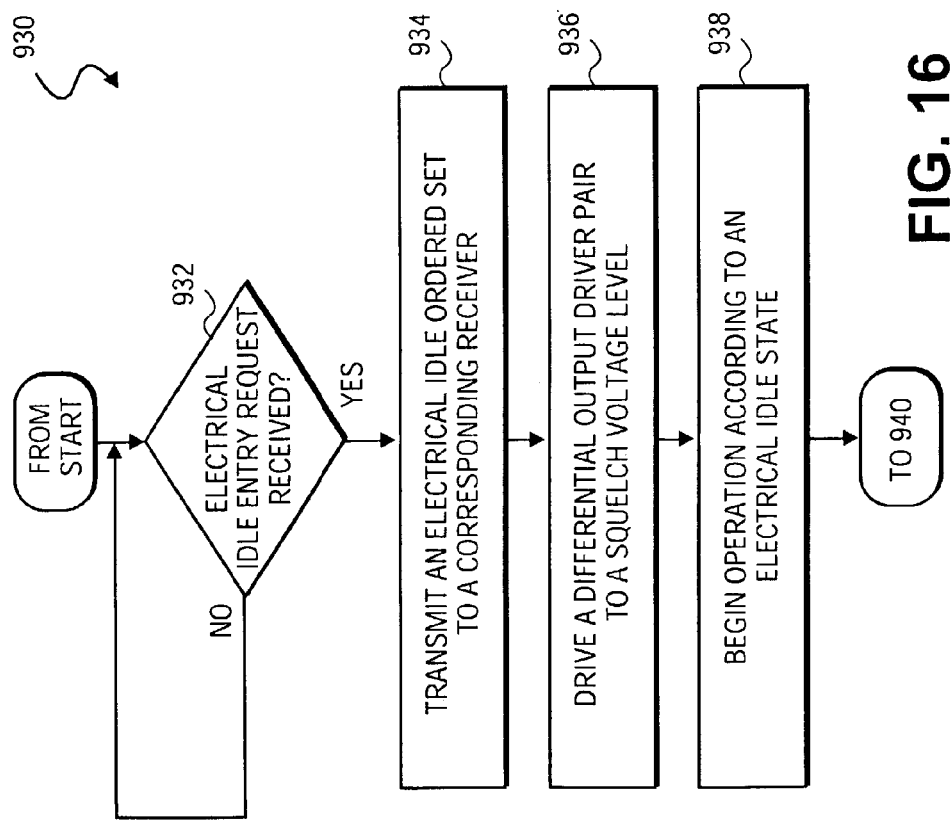
FIG. 16 depicts a flowchart illustrating a method performed by a transmitter when directed to enter an electrical idle state, in accordance with a further embodiment of the present invention.

Referring now to FIG. 16, FIG. 16 depicts a flowchart illustrating a method 930 performed by a transmitter within a 3GIO link when directed to enter an electrical idle state, in accordance with one embodiment of the present invention. At process block 932, it is determined whether the receiver receives an electrical idle entry request during operation according to a normal power state L0. In general, the chipset, or device, utilizing the 3GIO link will direct the 3GIO link transmitter to enter the electrical idle state L0s. Consequently, once the request is received, the transmitter transmits an electrical idle ordered set to a corresponding receiver.

In one embodiment, the electrical idle order set is comprised of an 8b/10b code, K28.5 control character (comma) followed by three K28.3 (IDL) control characters, as depicted with reference to Table 1. Once the last symbol of the electrical idle ordered set is transmitted, the transmitter enters an electrical idle state for an undetermined period. During this period, as depicted with reference to process block 938, the transmitter will drive a differential output driver pair to a squelch voltage, as depicted with reference to FIG. 4. Finally, at process block 938, the transmitter begins operation according to an electrical idle state for at least a minimum predetermined amount of time.

Figure 17:
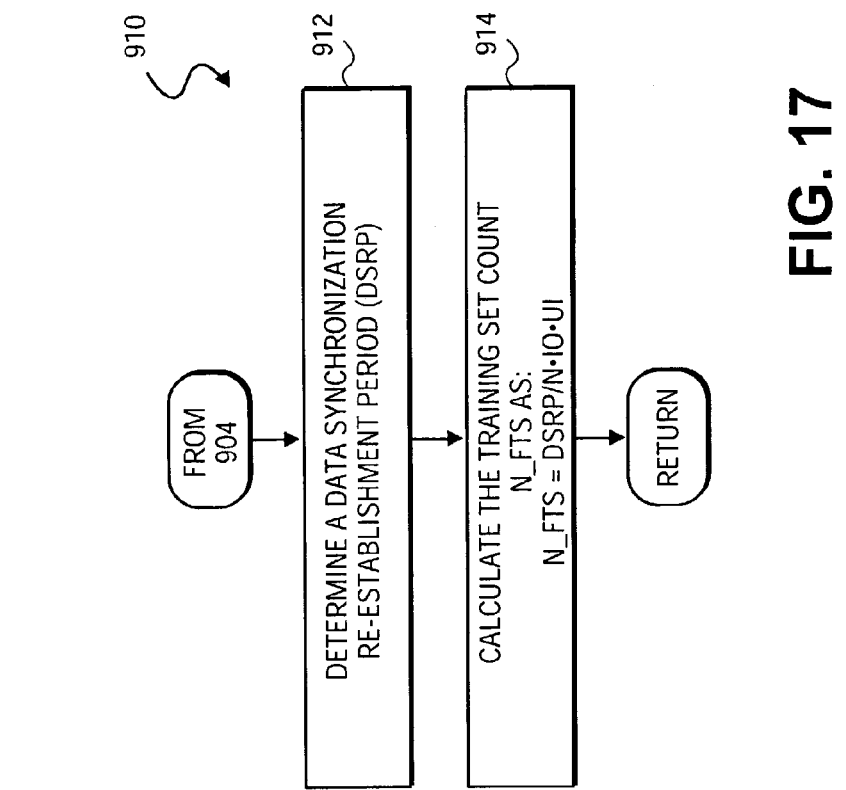
FIG. 17 depicts a flowchart illustrating an additional method for determining a training set count, in accordance with a further embodiment of the present invention.

Finally, referring to FIG. 17, FIG. 17 depicts an additional method 910 performed during process block 904, as depicted with reference to FIG. 15 and in accordance with the further embodiment of the present invention. As depicted with reference to FIG. 17, additional method 910 enables calculation of the training set count. As described above, the training set count is utilized to calculate a symbol re-establishment period, which establishes the maximum latency time in which a receiver must reacquire bit lock, as well as symbol synchronization. Otherwise, data synchronization is performed during, for example, a reconfiguration state.

Accordingly, at process block 912, the transmitter determines a data synchronization re-establishment period (DSRP). This period may be set as desired by different system implementations. Accordingly, once the re-establishment period is determined, the transmitter calculates the training set count (N_FTS) as $N\_FITS=DSRP \div (N \times 10 \times UI)$. As described, the N value refers to a number of symbols within each FTS ordered set, whereas UI represents a unit interval indicating a value measured by averaging a time interval between voltage transitions over a time interval long enough to make all intentional frequency modulations of a source clock negligible. In one embodiment, UI is equal to approximately 400 picoseconds, whereas the minimum amount of time that a transmitter remains in the electrical idle state is equal to approximately 20 UI.

Accordingly, utilizing the embodiments of the present invention, 3GIO links may be utilized within computer systems, which enable the energy conservation by operation within the electrical idle L0s state while providing low latency resumption of a normal power state in order to conserve energy when transmitting uni-directional information. Likewise, due to the low latency, bi-directional communication is easily transitioned from uni-directional communication due to the low latency normal power resumption provided using FTS ordered sets. Likewise, an open loop synchronization is provided wherein successful bit and symbol alignment is not necessarily communicated to a transmitter pair of a receiver. However, failure to establish symbol and data resynchronization is communicated by transitioning of transmitter and receiver lane pairs into a reconfiguration state.

Alternate Embodiments

Several aspects of one implementation of the power management of a serial data link for providing low latency resumption of a normal operation state from an electrical idle state have been described. However, various implementations of the power management of a serial data link provide numerous features including, complementing, supplementing, and/or replacing the features described above. Features can be implemented as part of the device interconnect or as part of the chipset and hardware devices in different embodiment implementations. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

In addition, although an embodiment described herein is directed to a serial data, it will be appreciated by those skilled in the art that the embodiments of the present invention can be applied to other systems. In fact, systems for high-speed data buses fall within the embodiments of the present invention, as defined by the appended claims. The embodiments described above were chosen and described in order to best explain the principles of the embodiments of the invention and its practical applications. These embodiments were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed.

The embodiments of the present invention provides many advantages over known techniques. In one embodiment, the present invention includes the ability to resume operation in a normal power state when a receiver is operating in a power saving state with a reduced latency. In one embodiment described, symbol lock and bit lock are performed with a reduced latency when a receiver operates in a low power state. Consequently, by quickly re-establishing bit synchronization, symbol synchronization and protocol synchronization, a serial data link can be quickly transitioned from a low power state to a normal operation state. In doing so, transmit pairs can be in a normal power state, in one direction, and in a low power state, in an opposite direction, which reduces voltage requirements between various I/O devices. Moreover, utilizing the fast training sequence described herein, an open loop synchronization is described wherein feedback to a transmitter is provided during failure, whereas when successful synchronization is achieved, no feedback is provided.

Having disclosed exemplary embodiments and the best mode, modifications and variations may be made to the disclosed embodiments while remaining within the scope of the embodiments of the invention as defined by the following claims.

What is claimed is:

1. A method comprising:
    detecting, during operation in an electrical idle state, an electrical idle exit condition;
    once the electrical idle exit condition is detected, performing data synchronization to achieve bit lock and symbol lock according to one or more received data synchronization training patterns; and
    when a time required to perform synchronization falls within a predetermined synchronization re-establishment period, resuming operation according to a normal power state.

2. The method of claim 1, wherein prior to detecting, the method further comprises:
    receiving one or more initialization training patterns, including a training set count;
    storing the training set count to enable calculation of the synchronization period;

performing data synchronization according to the one or more received initial data synchronization training patterns; and once synchronization is complete, beginning operation according to the normal power state.

3. The method of claim 2, further comprising:

detecting, during operation according to the normal power state, an electrical idle entry condition; and once detected, initializing operation according to the electrical idle state.

4. The method of claim 2, wherein detecting the electrical idle entry condition comprises:

detecting receipt of an ordered set comprising one or more control characters;

when the received ordered set is identified as an electrical idle training pattern, detecting the received ordered set as an electrical idle entry condition; and once the electrical idle entry condition is detected, delaying initialization to the electrical idle state for a predetermined period of time.

5. The method of claim 1, wherein detecting further comprises:

detecting, at a receiver input, a transition from a squelch voltage to a normal voltage level as the electrical idle exit condition.

6. The method of claim 1, wherein perform data synchronization further comprises:

receiving the one or more data synchronization training patterns;

performing the bit lock according to signal transitions within the one or more received data synchronization training patterns; and performing the symbol lock according to one or more predetermined symbols within the one or more received data synchronization training patterns.

7. The method of claim 6, wherein performing bit lock further comprises:

performing edge detection within the received data synchronization training patterns;

designating determined edges as one of a left edge and a right edge; and adjusting a phase of a data clock until an equal number of phase increments fall within a left edge and a right edge.

8. The method of claim 6, wherein performing symbol lock further comprises:

analyzing the received data synchronization training pattern to detect a predetermined symbol; and designating data detected between predetermined symbols as received data.

9. The method of claim 1, wherein resuming power further comprises:

once synchronization is performed, comparing a time period required to achieve the data synchronization to the predetermined synchronization re-establishment period of time calculated according to a received training set count;

when the required synchronization time exceeds the re-establishment synchronization time, initializing a synchronization recovery state; and otherwise, initializing operation according to the normal power state.

10. The method of claim 6, wherein receiving the one or more data synchronization training patterns comprises:

receiving a number of data synchronization training patterns according to the received data synchronization training count contained within an initialization training pattern, wherein, each training pattern comprises a K28.5 control character as a symbol identification value followed by three K28.1 control characters as bit lock training symbols.

11. A computer readable storage medium including program instructions that direct a computer to perform one or more operations when executed by a processor, the program instructions comprising:

detecting, during operation in an electrical idle state, an electrical idle exit condition;

once the electrical idle exit condition is detected, performing data synchronization to achieve bit lock and symbol lock according to one or more received data synchronization training patterns; and when a time required to perform synchronization falls within a precalculated synchronization re-establishment period, resuming operation according to a normal power state.

12. The computer readable storage medium of claim 11, wherein prior to detecting, the method further comprises:

receiving one or more initialization training patterns, including a training set count;

storing the training set count to enable calculation of the synchronization period;

performing data synchronization according to the one or more received initial data synchronization training patterns; and once synchronization is complete, beginning operation according to the normal power state.

13. The computer readable storage medium of claim 12, further comprising:

detecting, during operation according to the normal power state, an electrical idle entry condition; and once detected, initializing operation according to the electrical idle state.

14. The computer readable storage medium of claim 12, wherein detecting the electrical idle entry condition comprises:

detecting receipt of an ordered set comprising one or more control characters;

when the received ordered set is identified as an electrical idle training pattern, detecting the received ordered set as an electrical idle entry condition; and once the electrical idle entry condition is detected, delaying initialization to the electrical idle state for a predetermined period of time.

15. The computer readable storage medium of claim 11, wherein detecting further comprises:

detecting, at a receiver input, a transition from a squelch voltage to a normal voltage level as the electrical idle exit condition.

16. The computer readable storage medium of claim 11, wherein perform data synchronization further comprises:

receiving the one or more data synchronization training patterns;

performing the bit lock according to signal transitions within the one or more received data synchronization training patterns; and performing the symbol lock according to one or more predetermined symbols within the one or more received data synchronization training patterns.

17. The computer readable storage medium of claim 16, wherein performing bit lock further comprises:

performing edge detection within the received data synchronization training patterns;

designating determined edges as one of a left edge and a right edge; and adjusting a phase of a data clock until an equal number of phase increments fall within a left edge and a right edge.

18. The computer readable storage medium of claim 16, wherein performing symbol lock further comprises:
analyzing the received data synchronization training pattern to detect a predetermined symbol; and
designating data detected between predetermined symbols as received data.

19. The computer readable storage medium of claim 11, wherein resuming power further comprises:
once synchronization is performed, comparing a time period required to achieve the data synchronization to the precalculated synchronization re-establishment period of time calculated according to a received training set count;
when the required synchronization time exceeds the re-establishment synchronization time, initializing a synchronization recovery state; and
otherwise, initializing operation according to the normal power state.

20. The computer readable storage medium of claim 16, wherein receiving the one or more data synchronization training patterns comprises:
receiving a number of data synchronization training patterns according to the received data synchronization training count contained within an initialization training pattern, wherein, each training pattern comprises a K28.5 control character as a symbol identification value followed by three K28.1 control characters as bit lock training symbols.

21. A method comprising:
receiving, during operation according to an electrical idle state, an electrical idle exit request;
once the electrical idle exit request is received, driving a transmitter differential output pair to a normal voltage level;
transmitting one or more data synchronization training patterns to a corresponding receiver according to a training set count to enable the receiver to achieve bit lock and symbol lock according to one or more received data synchronization training patterns; and
once the one or more data synchronization training patterns are transmitted, resuming operation according to a normal power state.

22. The method of claim 21, wherein prior to receiving, the method further comprises:
transmitting one or more initialization training patterns, including a training set count, to the receiver to enable data synchronization; and
following a predetermined period, driving a differential output transmitter pair to a normal voltage level to begin operation according to the normal power state.

23. The method claim 21, wherein, prior to receiving, the method further comprises:
receiving, during operation according to a normal power state, an electrical idle entry request;
once the request is received, transmitting an electrical idle ordered set to a corresponding receiver;
once the electrical idle ordered set is transmitted, driving a differential output driver pair to a squelch voltage level; and
beginning operation according to an electrical idle state.

24. The method of claim 22, wherein prior to transmitting, the method further comprises:
determining a data synchronization re-establishment period (DSRP); and
once the re-establishment period is determined, calculating the training set count as:

$$N\_FTS = \frac{DSRP}{N \cdot IO \cdot UI},$$

wherein N represents a number of symbols within each training patterns and UI represents a unit interval indicating a value measured by averaging a time interval between voltage transitions over a time interval long enough to make all intentional frequency modulations of a source clock negligible.

25. The method of claim 21, wherein, each training pattern comprises a K28.5 control character as a symbol identification value followed by three K28.1 control characters as bit lock training symbols.

26. A computer readable storage medium including program instructions that direct a computer to perform one or more operations when executed by a processor, the program instructions comprising:
receiving, during operation according to an electrical idle state, an electrical idle exit request;
once the electrical idle exit request is received, driving a transmitter differential output pair to a normal voltage level;
transmitting one or more data synchronization training patterns to a corresponding receiver according to a training set count to achieve bit lock and symbol lock according to one or more received data synchronization training patterns; and
once the one or more data synchronization training patterns are transmitted, resuming operation according to a normal power state.

27. The computer readable storage medium of claim 26, wherein prior to receiving, the method further comprises:
transmitting one or more initialization training patterns, including a training set count, to the receiver to enable data synchronization; and
following a predetermined period, driving a differential output transmitter pair to a normal voltage level to begin operation according to the normal power state.

28. The computer readable storage medium claim 26, wherein, prior to receiving, the method further comprises:
receiving, during operation according the normal power state, an electrical idle entry request;
once the request is received, transmitting an electrical idle ordered set to a corresponding receiver;
once the electrical idle ordered set is transmitted, driving a differential output driver pair to a squelch voltage level; and
beginning operation according to an electrical idle state.

29. The computer readable storage medium of claim 27, wherein prior to transmitting, the method further comprises:
determining a data synchronization re-establishment period (DSRP); and
once the re-establishment period is determined, calculating the training set count as:

$$N\_FTS = \frac{DSRP}{N \cdot IO \cdot UI},$$

wherein N represents a number of symbols within each training patterns and UI represents a unit interval indicating a value measured by averaging a time interval between voltage transitions over a time interval long enough to make all intentional frequency modulations of a source clock negligible.

30. The computer readable storage medium of claim 26, wherein, each training pattern comprises a K28.5 control character as a symbol identification value followed by three K28.1 control characters as bit lock training symbols.

31. A system comprising:
a chipset coupled to at least one device end-point via a point-to-point interconnect, wherein the interconnect support link during exit from an electrical idle state; and
the end-point including at least one receiver to perform data synchronization during the link training to achieve bit lock and symbol lock in response to synchronization training patterns received during operation according to the electrical idle state to enable low latency resumption of a normal power state.

32. The system of claim 31, wherein 3GIO interconnects comprise:
a high-speed 3GO link including a plurality of transmitter and receiver lane pairs, which support uni-directional normal operation by a subset of the transmitter and receiver lane pair while remaining transmitter and receiver lane pair operate in an electrical idle state.

33. The system of claim 31, wherein:
the chipset comprises memory controller hub and the hardware device comprises a graphics application.

34. An apparatus comprising:
a differential output driver pair; and
a controller to transmit an electrical idle ordered set to at least one receiver according to an electrical idle entry request to provide the receiver with an electrical idle entry condition and to drive the differential output pair to a squelch voltage to begin operation according to an electrical idle state,
wherein the controller is further to drive the differential output pair to a normal voltage according to a received electrical idle exit request, to transmit one or more data synchronization patterns on the differential output driver pair according to a training set count to support link training during an exit from the electric idle state to enable the receiver to perform data synchronization during the link training to achieve bit lock and symbol lock in response to the transmitted synchronization training patterns, the controller to resume operation according to the normal power state following the transmission of the data synchronization patterns.

35. The apparatus of claim 34, wherein the controller comprises a chipset.

36. The apparatus of claim 34, wherein the controller comprises a memory controller hub.

37. A method comprising:
transmitting an electrical idle ordered set to a corresponding receiver according to a received electrical idle entry request to provide the receiver with an electrical idle entry condition;
driving a differential output pair to a squelch voltage to begin operation according to an electrical idle state; and
transmitting one or more data synchronization training patterns to a corresponding receiver according to a training set count to enable the receiver to achieve bit lock and symbol lock according to one or more received data synchronization training patterns to enable link training during an exit from the electrical idle state to provide low latency resumption to a normal power state.

38. The method of claim 37, further comprising:
driving the differential output pair to a normal voltage according to a received electrical idle exit request;
transmitting the one or more data synchronization patterns to the corresponding receiver according to a training set count; and
once the one or more data synchronization patterns are transmitted, resuming operation according to the normal power state.

39. The method of claim 38, wherein prior to transmitting, the method further comprises:
determining a data synchronization re-establishment period (DSRP); and
once the data synchronization re-establishment period is determined, calculating the training set count.

* * * * *